Aug. 1, 1967 W. R. BREWSTER 3,333,834
BAIT TANK AERATOR
Filed April 6, 1964
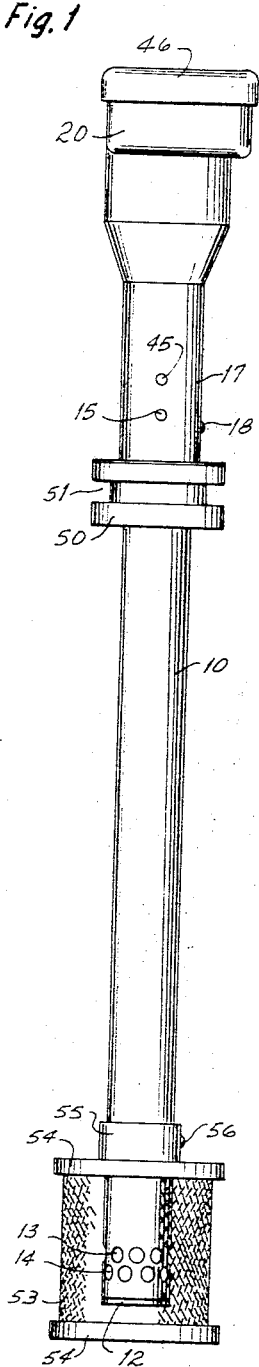
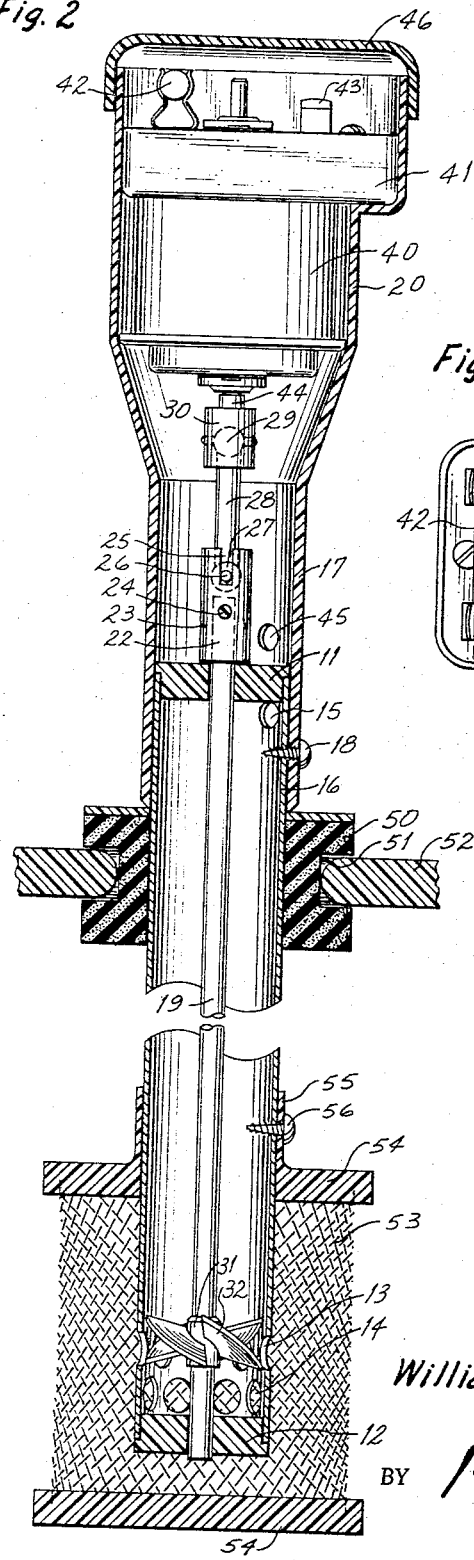
William R. Brewster
INVENTOR.
BY
ATTORNEY 3,333,834
BAIT TANK AERATOR
William R. Brewster, 1222 Range Ave.,
Clearwater, Fla. 33515
Filed Apr. 6, 1964, Ser. No. 357,655
1 Claim. (Cl. 261—84)

This invention relates to liquid aerators and is particularly concerned with supplying air in relatively fine increments to fish tanks and for intimately mingling and impregnating the water of such tanks with the air discharged thereto. While the present invention is broadly applicable in the aeration of various types of tanks for aquatic life preservation, it is especially applicable in meeting the problems of aeration confronted by the users of live fish bait tanks in boats, where the fish are numerous in relation to the cubic capacity of the tank, and where oxygen producing plant life is not available.

The present invention provides a novel, simple and improved means for introducing an adequate supply of air deep below the water surface of bait tanks as used in small fishing boats, and provides for the energization of the device from the readily available electrical batteries of the boat propulsion system. The structure of that form of the invention here presented by way of illustration, may be broadly defined as including an air delivery tube adapted to extend well below the surface of the water of the bait tank. The lower end of the tube is closed and is provided with vertically spaced circular groups of inlet apertures. An air impeller, the center of rotation of which is approximately in the plane of the upper group of apertures, is provided. The impeller is mounted on a central rotary shaft, driven by a simple, inexpensive and operatively economic, electrical motor mounted on the tube above the water level, to be energized by the conventional motor batteries. Air is admitted to the upper end of the tube above the water surface. The construction and arrangement is such that upon rotation of the impeller, air will be delivered through the tube to the liquid-air interface at the impeller, when the impeller churns air into the water and at the same time forcing air and water downwardly for discharge through the lower apertures to thoroughly impregnate the water with the fine air particles.

Specific structural features by which the invention provides simple and compact construction, efficiency and durability by which it meets the demands of economic manufacture, include a unitary, preferably plastic, motor mounting head and sealed enclosure for fuses and electrical connections, a unique torque responsive shock absorbing motor to shaft drive and shaft bearing and aligning means formed as closures for the upper and lower ends of the tube.

From the foregoing, it will be seen that the present invention has as a primary object, that of producing an adequate supply of air for fish bait tanks, and to provide for the discharge of air into the tank in fine particles churned into the tank water. A further important object is to provide a readily applied or detached device of this character, which may be energized by the usual batteries of the boat motor. The arrangement is such that aquatic life may be maintained in a healthy, vigorous condition over a long period of time, despite crowded conditions and the absence of plant life. Numerous other objects, features and advantages of the present invention will be apparent from a consideration of the following specification taken in conjunction with the accompanying drawings, in which:

FIG. 1 is a side elevation of the presently preferred form of the invention,

FIG. 2 is a detailed and enlarged vertical sectional view of the invention as disclosed in FIGURE 1, and FIG. 3 is a top plan view of the device with the motor housing cover removed.

In the drawings, the numeral 10 indicates an air induction tube, preferably an elongate thin-walled cylindrical member closed at each end by upper and lower shouldered and apertured rod bearing plugs 11 and 12 respectively. At the lower end of the tube upper and lower circumferential groups of apertures 13 and 14 are provided. At the opposite upper end of the tube, above the water line, an air inlet aperture 15 is provided. It will, of course, be understood that the apertures may be of such number, size and configuration as the circumstances dictate. It will further be understood that in practice, the tube is preferably mounted in a generally vertical position as shown.

The upper end 16 of the tube 10 which includes the aperture 15, is press fitted within the cylindrical depending neck 17 of an otherwise generally rectangular motor housing 20. A screw 18 secures the tube 10 within the neck 17.

Centrally of the tube 10; there is provided an axially extended impeller rod 19 mounted through the rod bearing plugs 11 and 12. The lower end of the impeller rod 19 is here shown as terminating just below the lower bearing plug 12, while the upper end 22 of the impeller rod extends upwardly beyond the upper bearing plug 11. At the upper terminal end of the rod 19, above the bearing plug 11, the impeller rod 19 has secured thereto a cylindrical drive coupling 23. The coupling 23 is engaged for driving relation with the upper terminal end of the rod 19 by set screw 24. The rod 19 terminates within the coupling 23 leaving an internal space above the upper end of the rod within the coupling. The walls of the coupling 23 above the upper end of the rod 19 define opposed slots 25 which receive laterally extending drive studs 26 protruding from the lower spherical end 27 of a driving connector 28 which may preferably be formed of plastic material or like yieldable composition, which may absorb shock in the driving of the rod 19. The opposite upper end of the connector 28 is similarly formed as at 29 to be received in driving connection with a socket 30 mounted on the drive shaft of the motor (hereinafter discussed) construction of which is similar to the construction of the coupling 23 secured to the rod 19.

In this arrangement, it will be noted that the lower face of the coupling 23 bears against the upper face of the upper bearing plug 11, thus restraining the rod against downward axial movement with respect to the tube, upward movement being precluded by engagement with the connector 28.

Mounted on the lower end of the rod 19 and secured thereto for rotation therewith, is an impeller 31. The impeller 31 is so located on the rod 19 as to dispose its blades 32 in the plane of the upper circumferential group of apertures 13. This arrangement is such that upon initial rotation of the rod 19, liquid in the tube 10 above the impeller 31, is first discharged downwardly from the tube 10 while air is drawn into the tube through the aperture 15 to produce water-air interface at the level of the impeller and the upper group of apertures. As the blades continue to rotate, air may be discharged through the apertures 13 and 14. However, since the tips of the impeller blades 32 are inclined across the plane of the air-water interface, in contact with water at their lower edges and with air at their upper edges, the rotation will produce a frothing and co-mingling of air and water. This churned mixture of water and minute air bubbles will be driven down by the blades 32 to be discharged through the lower series of apertures 14. By this arrangement an intimate admixture of air and water will be discharged into the body of water surrounding the tube, whereby the water is oxygenated in order to maintain the fish of the tank in healthy condition.

For rotating the rod 19 there is seated within the upper end of the housing 20 an electrical motor 40 of conforming rectangular configuration with the upper portion of the housing to be sealingly engaged therein. In the preferred form of the invention, the housing is preferably formed of yieldable plastic material, which is water resistant and which sealingly engages the motor and the tube 10. The motor 40 is provided with a rectangular head 41 fitted within an upper rectangular extension of the housing and provided with a controlling fuse member 42 and conventional conductor receiving connectors 43. It will be understood that motors of a type adequately energized by the conventional six or twelve volt battery used in association with inboard or outboard motors of the type used to propel small fishing boats are contemplated. Downwardly, extending from the motor 40, there is provided a rotary motor shaft 44 upon which is mounted the socket 30 for imparting rotation to the rod 19 through the connector 28 when the motor is energized. An aperture 45 is provided in the neck of the motor neck 17 of the motor housing to permit air circulation to assist in cooling the motor, and a removable cap 46 encloses the motor within the housing 20.

As a convenient means of mounting the aerator in a vertical position, with its lower end within the waters of the bait tank, the tube may be provided with a yieldable sponge rubber or equivalent gasket 50, the central portion of which is formed with a recess 51 to be received within an aperture of a bait tank cover 52. It will be understood, however, that other means may be employed for appropriately mounting the present unit.

If desired, the lower apertured end of the tube 10 may be enclosed within a cylindrical mesh guard 53, mounted between end discs 54. The upper disc 54 may engage the tube 10 by a neck 55 secured to the tube 10 by a screw 56, or the equivalent.

It is to be particularly understood, however, that the tube mounting gasket 50 and guard 53 are shown merely by way of example and form no part of the present inventive concept.

It will be understood that in the practice of the invention, numerous changes, modifications, and full use of equivalents may be resorted to without departure from the spirit or scope of the invention as outlined in the appended claim.

What I claim is:

A bait tank aerator, including a tubular air induction tube adapted to be placed partially immersed vertically in a tank of water, a rod rotatably mounted and coaxially disposed in said tube, a multi-blade impeller mounted on said rod within said tube and fixed for rotation with said rod, a battery driven motor mounted on a first end of said tube and engageable with said rod for rotating said rod, said tube having a circumferential group of apertures in the plane of said impeller, a spaced group of apertures below the plane of the impeller, means for conducting the flow of air into the first end of said tube, through the tube, and into the water at a second end of the tube, including an orifice at said first end to permit air inflow and a plug member at the second end of said tube to prevent the outflow of air therethrough, the peripheral wall of said tube being imperforate along its length between said orifice and said groups of apertures, whereby upon rotation of the impeller a water-air interface will be established at the plane of the upper group of apertures and air and water will be discharged from said tube through said lower group of apertures.

References Cited

UNITED STATES PATENTS

| | | |
|---|---|---|
| 2,471,573 | 5/1949 | Lumpkin. |
| 2,641,455 | 6/1953 | Poirot. |
| 2,865,618 | 12/1958 | Abell. |
| 2,951,309 | 9/1960 | Briscoe. |
| 2,970,401 | 2/1961 | Hays. |
| 3,189,334 | 6/1965 | Bell. |

HARRY B. THORNTON, *Primary Examiner.*

E. H. RENNER, *Assistant Examiner.*